(12) United States Patent
Tanioka et al.

(10) Patent No.: US 6,391,183 B1
(45) Date of Patent: May 21, 2002

(54) APPARATUS FOR PRODUCING OZONE WATER AND METHOD OF PRODUCING OZONE WATER BY USING THE SAME APPARATUS

(75) Inventors: Takashi Tanioka; Mituo Terada; Akira Kanbeshiyama; Kazuhisa Okada; Noriaki Okubo; Toshikazu Sawada, all of Kobe (JP)

(73) Assignees: Shinko Plant Construction Co., Ltd.; Kobe Steel, Ltd., both of Kobe (JP)

( * ) Notice: Subject to any disclaimer, the term of this patent is extended or adjusted under 35 U.S.C. 154(b) by 0 days.

(21) Appl. No.: 09/581,157
(22) PCT Filed: Dec. 9, 1998
(86) PCT No.: PCT/JP98/05576
 § 371 Date: Jun. 12, 2000
 § 102(e) Date: Jun. 12, 2000
(87) PCT Pub. No.: WO99/29929
 PCT Pub. Date: Jun. 17, 1999

(30) Foreign Application Priority Data

Dec. 10, 1997 (JP) .............................. 9-340188

(51) Int. Cl.⁷ ................................................ C25C 1/00
(52) U.S. Cl. ................ 205/626; 204/228.1; 204/228.6; 204/230.2; 422/186.13
(58) Field of Search ....................... 205/626; 204/228.1, 204/230.2, 228.6; 422/186.12, 186.13, 186.14

(56) References Cited

U.S. PATENT DOCUMENTS 4,498,962 A * 2/1985 Oda et al. .................... 205/632

FOREIGN PATENT DOCUMENTS

EP 0 627 501 A2 * 12/1994
JP 8-134678 A * 5/1996

OTHER PUBLICATIONS

Biryulin et al. (English Abstract of SU 1201351 A–Published Dec. 1985).*
Reference N was cited on the International Search Report.*

* cited by examiner

Primary Examiner—Edna Wong
Assistant Examiner—Wesley A. Nicolas
(74) Attorney, Agent, or Firm—Oblon, Spivak, McClelland, Maier & Neustadt, P.C.

(57) ABSTRACT

An ozonized water generating device in which an inside of a casing is defined by a solid electrolyte film into an anode chamber and a cathode chamber. An anode electrode made of noble metal having an ozone generating catalyst function is arranged to be impressed against the solid electrolyte film at the anode chamber, a cathode electrode is arranged to be impressed against the solid electrolyte film at the cathode chamber, respectively. Each of the anode chamber and the cathode chamber is provided with a raw water flow inlet port and an electrolyzed water flow outlet port, and a DC voltage is applied between the anode electrode and the cathode electrode, wherein either one of or both the anode electrode and the cathode electrode are arranged in such a way that they can be impressed against and separated from the solid electrolyte film by a movable driving piece.

20 Claims, 10 Drawing Sheets

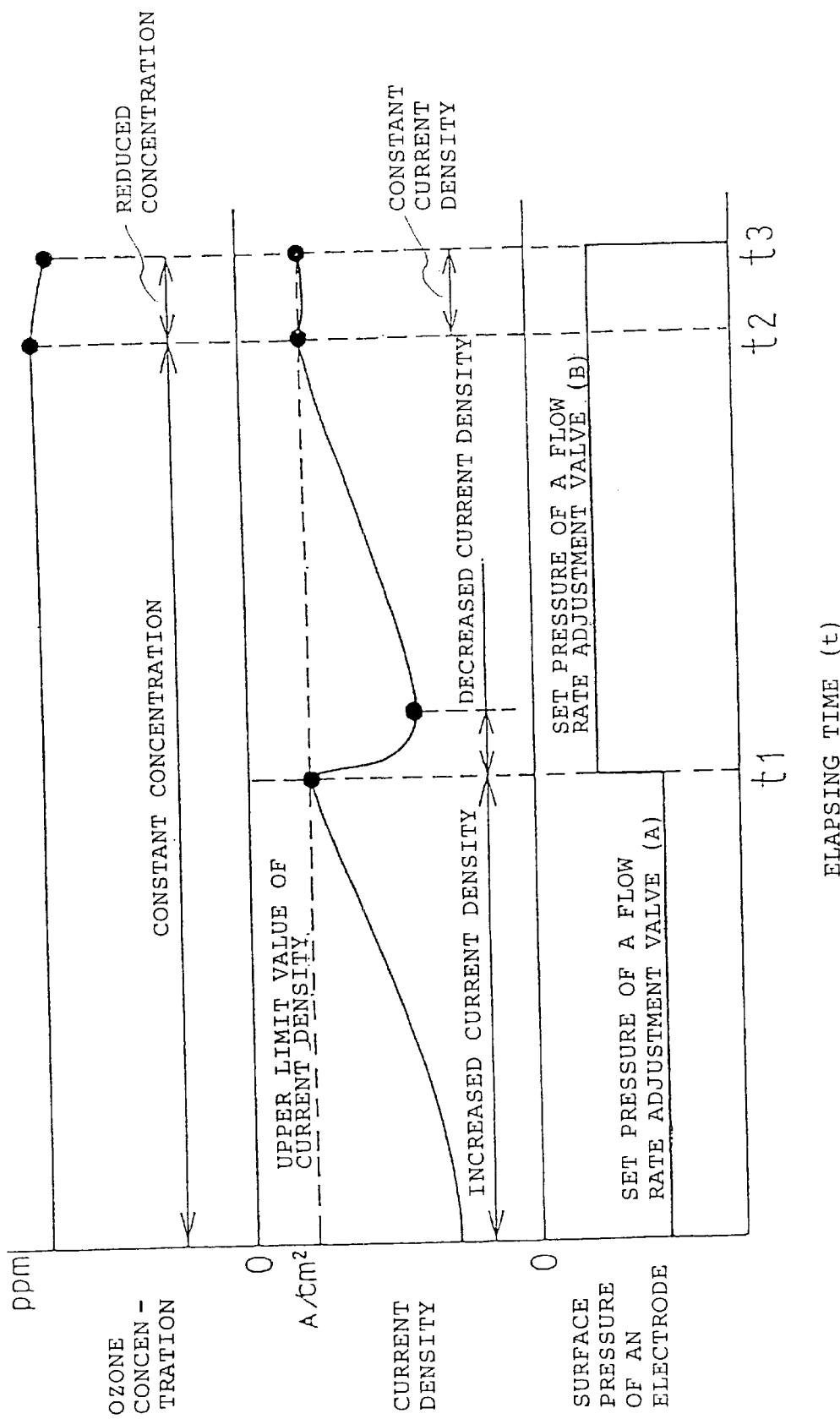

APPARATUS FOR PRODUCING OZONE WATER AND METHOD OF PRODUCING OZONE WATER BY USING THE SAME APPARATUS

BACKGROUND OF THE INVENTION

1. Field of the Invention

This invention relates to a device for generating ozonized water by electrolysis of water and a method for generating ozonized water with this device, and more particularly an ozonized water generating device and a method for generating ozonized water with this device in which an inner side of a casing is defined into an anode chamber and a cathode chamber by a solid electrolyte film, an anode electrode attached noble metal having an ozone generating catalyst function is arranged at the solid electrolyte film surface at the anode chamber and a cathode electrode is arranged at the solid electrolyte film surface at the cathode chamber, respectively.

2. Discussion of the Background

Although both a gas dissolving method and a water electrolysis method have been well known as a typical method for obtaining ozonized water in the prior art, it is worthy of notice to apply a water electrolysis method in recent years which has some advantages such as a small-sized device, applicability of water which may easily be available as raw material and sufficient application of small-sized power source device of several tens volts and several tens amperes.

As a device applied in an efficient generating method for generating ozone by the aforesaid water electrolysis method, such devices as those disclosed in Japanese Patent Laid-Open Nos. Hei 1-312092, 8-134677 and 8-134678, for example. A schematic configuration of this device is made as shown in FIG. 13 that an inside part of the casing 81 is divided into the anode chamber 83 and the cathode chamber 84 by the solid electrolyte film 82, the anode electrode 86 made of noble metal (platinum or the like) 85 with an ozone generating catalyst function is contacted with the solid electrolyte film surface at the anode chamber side and the cathode electrode 88 made of noble metal (platinum, silver and the like) 87 is contacted with the solid electrolyte film surface at the cathode chamber side, respectively, each of the anode chamber 83 and the cathode chamber 84 is provided with raw water flow inlets 89, 90 and electrolized water flow outlet ports 91, 92 and further a DC power source 93 is connected between the anode electrode 86 and the cathode electrode 88.

In the case of the ozonized water generating device with the configuration shown in FIG. 13, when a DC current is flowed between both electrodes 86, 88, an electrolysis of water is produced between the noble metallic catalyst 85 for the anode and the noble metallic catalyst 87 for the cathode with the solid electrolyte film 82 being held between them, both oxygen and ozone are generated at the anode electrode 86 and hydrogen is generated at the cathode electrode 88, respectively, and ozone generated at the anode side is dissolved in water to attain ozonized water. To attain the ozonized water of high concentration in an efficient manner by this ozonized water generating device, one of the present applicants has proposed it in the Japanese Patent Laid-Open No. 8-134677. Its content shows that the noble metal (platinum or the like) 85 having an ozone generating catalyst function is formed into a metallic net shape and the anode electrode 86 having a configuration in which a lath net made of anti-corrosion metal is laminated at catalyst side surface.

In the case of this anode electrode 86, the raw water being supplied to the anode chamber 83 is restricted to flow in a flow passage formed by the metallic net and the lath net, so that the water becomes a severe turbulence flow to generate an eddy flow while flowing through the metallic net and the lath net, ozone generated at the anode side is dissolved instantaneously after generation of ozone in the raw water becoming the severe turbulence flow and at the same time its action is accumulated continuously while the water is flowing at the anode electrode surface, resulting in that the ozonized water of high concentration can be generated in view of two effects of an instantaneous dissolution and the accumulating actions.

However, even such an ozonized water generating device shows that if a continuous operation is performed to attain a predetermined ozone concentration under an initial set current density, a deterioration of performance of the film itself is promoted and it becomes hard to maintain an ozone concentration as a time elapses, resulting in that a current density must be increased only by an amount corresponding to a reduced concentration of ozone. As understood from FIG. 14 showing a relation between the ozone concentration and the current density, a continuous operation to increase the current density causes the current density to reach an upper limit value in a current density variable region which is a limit value of the ozonized water generating device (time t1), subsequent to the upper limit value of the current density, there occurs a reduction of the ozone concentration and lastly the ozone concentration is lower than an allowable value, resulting in that the stop operation (time t2) occurs. Then, to return the device from this state to its initial performance state, the ozonized water generating device is decomposed to replace the solid electrolyte film itself, resulting in that the decomposing of the device and the replacing work for the electrolyte are quite troublesome and take such time, a life of the solid electrolyte film is short and an efficiency of use of the solid electrolyte film in regard to the generating of ozonized water is kept low.

This invention has been invented to eliminate the above problems and its object is to study a cause of deterioration of performance of the solid electrolyte film itself and extend a life of the solid electrolyte film and at the same time to provide an ozonized water generating device capable of reducing a frequent decomposition of the device as well as a frequent replacement of the solid electrolyte film and a rational method for generating ozonized water under application of this device.

SUMMARY OF THE INVENTION

The present inventors have met the above problems, surveyed and studied a surface state of the solid electrolyte film after its replacement to check a cause of deterioration of performance of the solid electrolyte film. However, the present inventors have used again the solid electrolyte film by chance while a clear cause can not be found, and found that the film can be used under a state in which the film substantially keeps its initial performance. After this state, the present inventors tried to use again a solid electrolyte film left for more than a certain period of time after replacement of the solid electrolyte film and found that the film can be used sufficiently. As described above, although a reason why the solid electrolyte film is recovered in its performance is not clear at present, a reason found in the prior art ozonized water generating device is assumed to be considered that the electrodes are always impressed against the solid electrolyte film with a resilient member or the like placed between the electrodes and the casing, a certain distortion may occur at holes of the film where hydrogen ions may pass from the anode side toward the cathode side under application of the impressing force and the electrolysis action to cause the hydrogen ions to be hardly passed through the holes, and the distortion is recovered after the solid electrolyte film is removed and left for more than a specified period of time. In addition, in the case that the impressing surface of each of the electrodes is a surface as found in a metallic net, in particular, the impressing position on the solid electrolyte film surface is changed when the film is used again, so that it may be considered that the recovering is promoted by this fact.

Its subsequent survey and study clarified that when the impressing force of the electrodes against the solid electrolyte film is increased after the current density reached up to the upper limit value in the current density variable region of a limit value of the ozonized water generating device, ozonized water with a predetermined concentration under a lower current density can be produced, and accordingly a generating of ozonized water can be continued until the current density reaches again up to the upper limit value in the current density variable region. A reason why this state occurred is assumed to be considered that although the solid electrolyte film surface having been contacted with the electrodes up to now was deteriorated and reached up to the upper limit value of current density, a new abutting surface with the electrodes, i.e. a region where the electrolysis can be applied was increased due to increasing the impressing force of the electrodes against the solid electrolyte film and a performance of electrolysis was recovered, thereby it is possible to assure an electrolysis time of longer hours than that of the prior art and then it becomes possible to extend a life of the solid electrolysis film.

However, even if the solid electrolyte film can be used again or used in its extended time as described above, the electrodes in the prior art ozonized water generating device were impressed against the solid electrolyte film by a resilient member or the like arranged between each of the electrodes and the casing in order to reduce a resistance between the solid electrolyte film and each of the electrodes and perform an efficient production of ozone and the solid electrolyte film which could not keep a performance of electrolysis had to be still replaced with a new one after decomposing the device.

In reference to the foregoing, it is an object of the present invention to provide a device capable of performing a long term stable and efficient generating of ozonized water and more particularly a device in which the solid electrolyte film can be used continuously for a long period of time.

The present invention has been invented in view of the aforesaid features, and it is characterized in that an inside of a casing is defined by a solid electrolyte film into an anode chamber and a cathode chamber, an anode electrode attached noble metal having an ozone generating catalyst function is arranged to be impressed against the solid electrolyte film at the anode chamber, a cathode electrode is arranged to be impressed against the solid electrolyte film at the cathode chamber, respectively, each of said anode chamber and said cathode chamber is formed with a raw water flow inlet port and an electrolized water flow outlet port, and a DC voltage is applied between said anode electrode and said cathode electrode, wherein either one of or both said anode electrode and said cathode electrode are arranged in such a way that they can be impressed against or removed from said solid electrolyte film by an movable driving means. With such an arrangement as above, the present invention is constituted such that the impressing force of either one or both of said anode electrode and said cathode electrode against said solid electrolyte film can be changed or both the impressing and the removing can be repeated.

In addition, as the first method for generating ozonized water with the ozonized water generating device of the present invention, there is provided a method for generating ozonized water in which an anode electrode made of noble metal having an ozone generating catalyst function is arranged at one surface of a solid electrolyte film, a cathode electrode is arranged at the other surface of said solid electrolyte film, at least one of both electrodes can be attached to or detached from said solid electrolyte film, a DC voltage is applied between said electrodes while raw water is flowing at each of the electrodes, wherein the ozonized water is generated under the state in which at least one of said electrodes is being impressed against said solid electrolyte film with a predetermined impressing force, a concentration of ozone in said generated ozonized water is detected and a current density of said DC current is changed in response to a variation of said concentration of ozone in such a way that said concentration of ozone may become substantially constant. As its modified examples of this method, there are a method in which said current density is increased before the ozone concentration in said generated ozonized water becomes less than a predetermined value and an impressing force of said electrodes against the solid electrolyte film is increased as said current density reaches a predetermined upper limit value; a method in which applying of said DC voltage is stopped before an ozone concentration of said produced ozonized water becomes less than a predetermined concentration, an impressing force of said electrodes against the solid electrolyte film is released, a DC voltage is applied again after elapsing a predetermined period of time, said electrodes are impressed against said solid electrolyte film and generating of ozonized water is re-started; and a method in which an operation for increasing said current density before an ozone concentration in said produced ozonized water becomes less than a predetermined concentration and increasing an impressing force of said electrodes against the solid electrolyte film as said current density reaches a predetermined upper limit value is carried out more than at least once, thereafter said applying of DC voltage is stopped before said ozone concentration becomes less than a predetermined concentration, releasing the impressing force of said electrodes against said solid electrolyte film, applying a DC voltage again after elapsing a predetermined period of time, impressing said electrodes against said solid electrolyte film and re-starting generating of ozonized water.

In addition, as the second method, there is provided a method for generating ozonized water characterized in that a predetermined DC current value is electrically applied between said electrodes under the state of said at least one electrodes being impressed against said solid electrolyte film, an ozone concentration of the generated ozonized water is detected and an impressing force of said electrodes against the solid electrolyte film is changed in response to a variation of said ozone concentration so as to cause said ozone concentration to be kept substantially constant. This second method has some modified examples as follows. That is, there are provided a method in which an impressing force of said electrodes against the solid electrolyte film is increased before the ozone concentration in said produced ozonized water becomes less than a predetermined value and said current density is increased when said impressing force reaches a predetermined upper limit value; or a method in which applying of said DC voltage is stopped before the ozone concentration of said generated ozonized water becomes less than a predetermined concentration, the impressing force of said electrodes against said solid electrolyte film is released, a DC voltage is applied again after elapsing a predetermined period of time, said electrodes are impressed against said solid electrolyte film to re-start generating of the ozonized water; and a method in which after an operation for increasing an impressing force of said electrodes against the solid electrolyte film before the ozone concentration of said generated ozonized water becomes less than a predetermined concentration and increasing said current density when said impressing force reaches a predetermined upper limit value is carried out more than at least once, applying of said DC voltage is stopped before said ozone concentration becomes less than a predetermined ozone concentration, the impressing force of said electrodes against said solid electrolyte film is released, the DC voltage is applied again after elapsing the predetermined period of time, said electrodes are impressed against said solid electrolyte film to re-start generating of ozonized water.

In all these methods, an impressing force of either one of or both the anode electrode and the cathode electrode in respect to the solid electrolyte film is changed to cause a new impressing surface to be generated and the solid electrolyte film to be activated, resulting in that a continuous electrolysis time can be substantially extended and a film life itself can be extended. Concurrently, it is possible to reduce the number of times of decomposing the ozonized water generating device to replace the solid electrolyte film, resulting in that a maintenance of the device may also be facilitated.

In addition, whatever any of these methods may be applied for generating ozonized water, a continuous generating of ozonized water becomes possible under a state in which a plurality of ozonized water generating devices are installed, said plurality of ozonized water generating devices are changed over in operation to generate ozonized water in a continuous manner in such a way that an ozonized water generating state is produced at least one unit of ozonized water generating device under the state in which the applying of said DC voltage is stopped in at least one unit of ozonized water generating device and an impressing of said electrodes against the solid electrolyte film is released.

BRIEF DESCRIPTION OF THE DRAWINGS

FIG. 9 is an illustrative view for showing a relation of a concentration of ozone, a current density and an electrolysis elapsing time in respect to the impressing force of the electrodes in the ozonized water generating device in accordance with the present invention.

DESCRIPTION OF THE PREFERRED EMBODIMENTS

Figure 1:
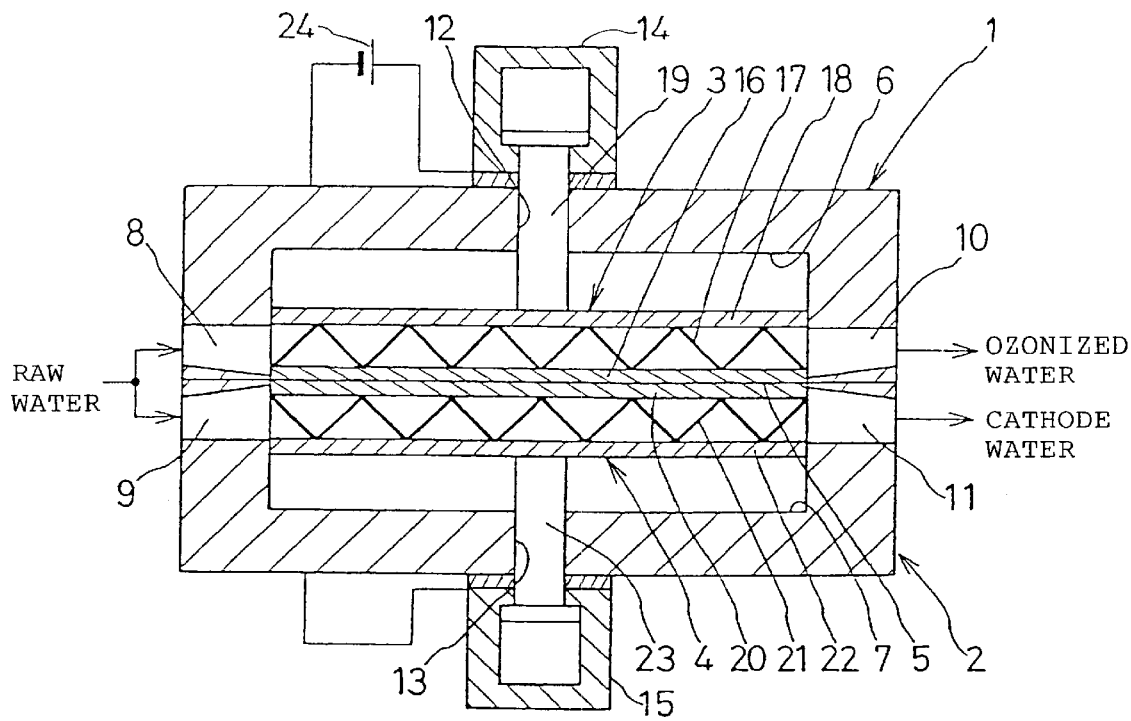
FIG. 1 is a schematic sectional view for showing substantial parts to illustrate the first preferred embodiment of an ozonized water generating device in accordance with the present invention and illustrates an impressed state of electrodes.

Referring now to the drawings illustrating some preferred embodiments of the ozonized water generating device and the ozonized water generating method performed under application of the ozone generating device in accordance with the present invention will be described in detail as follows.

Figure 2:
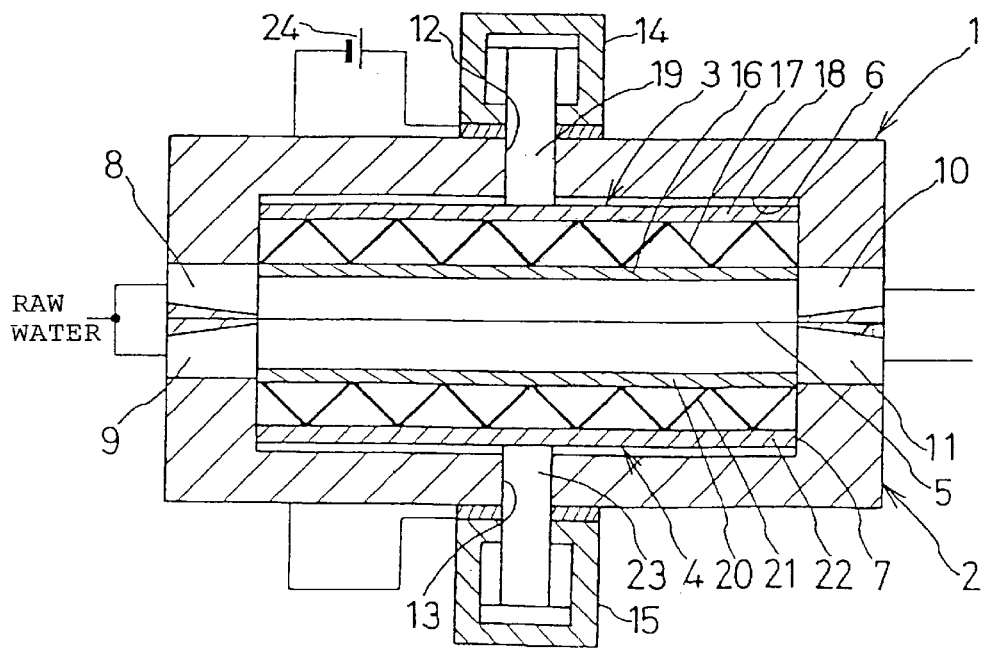
FIG. 2 shows a detached state of electrodes in the ozonized water generating device shown in FIG. 1.

FIGS. 1 and 2 are schematic sectional views for showing a substantial part of the ozonized water generating device in accordance with the present invention, wherein FIG. 1 shows a state in which the electrodes are pressed against the solid electrolyte film, and FIG. 2 shows a detached state in which the electrodes and the solid electrolyte film are separated away from each other, respectively. In these figures, reference numeral 1 denotes an anode side casing, reference numeral 2 denotes a cathode side casing, reference numeral 3 denotes an anode electrode, reference numeral 4 denotes a cathode electrode and reference numeral 5 denotes a solid electrolyte film.

The anode side casing 1 and the cathode side casing 2 are of the same configuration in the present invention, they are formed by ozonized water resistant material (for example, Teflon or glass or the like, or complex material coated by these materials), their central portions are formed with indentation 6 (7) acting as an anode chamber (a cathode chamber) having such a size as one where the anode electrode 3 (the cathode electrode 4, the reference numeral indicated in parenthesis denotes the cathode side and this is similarly applied hereinafter) can be slidably stored, each of a front side wall and a rear side wall is formed with an inlet port 8 (9) and an outlet port 10 (11) for raw and electrolized water, respectively. In addition, the bottom wall of the indentation 6 (7) is opened with a through-pass hole 12 (13) for use in inserting a rod-like electrode to be described later and to the rear surface of the casing 1 (2), i.e. the outer side surface of the bottom wall of the casing is fixed a hydraulic cylinder 14 (15) for moving the electrode 3 (4) forward or backward.

A noble metal net 16 having an ozone generating catalyst function, a lath net 17 made of metal such as titanium having an ozone resistant characteristic and the like and an electrode plate 18 are laminated on the anode electrode 3 in this sequence and integrally connected to each other by brazing or welding and the like and at the same time a rod-like electrode 19 is connected to the rear surface of the electrode plate 18. In addition, the cathode electrode 4 has the same configuration as that of the anode electrode 3, wherein a noble metal net 20, a lath net 21 made of metal such as titanium having an ozone resistant characteristic and an electrode plate 22 are laminated in this sequence and then a rod-like electrode 23 is connected to the rear surface of the electrode plate 22. Each of these anode electrode 3 and cathode electrode 4 is stored in the indentation 6 acting as an anode chamber and the indentation 7 acting as a cathode chamber in such a way that they may be moved forward or backward, each of the rod-like electrodes 19, 23 is passed through each of the through-pass holes 12, 13 opened at the bottom wall of each of the indentations 6, 7, fixed there and connected to a DC power source device 24. Further, the end parts of the rodlike electrodes 19, 23 are connected to the rods of the hydraulic cylinders 14, 15 under insulated state (the connected state between the rod and the rod-like electrode is eliminated in the figure).

The solid electrolyte film 5 is of a fluorine cation exchanging membrane, wherein this film is held and fixed between a circumferential end surface forming the indentation 6 of the anode side casing 1 and a circumferential end surface forming the indentation 7 of the cathode side casing 2.

Then, a method for generating ozonized water under application of the water generating device having the aforesaid configuration will be described as follows. The hydraulic cylinders 14, 15 are operated to cause each of the anode electrode 3 and the cathode electrode 4 to be pushed forward, the electrodes 4, 5 are impressed against the solid electrolyte film 5 under a predetermined pressure, then the opening or closing valve (not shown) in a water feeding circuit is opened to supply raw water from the flow inlet ports 8, 9 toward the flow outlets 10, 11 and at the same time a DC voltage is applied between the anode electrode 3 and the cathode electrode 4. With such an arrangement as above, both oxygen and ozone are generated at the anode electrode 3, hydrogen is generated at the cathode electrode 4, respectively, and the ozone generated at the anode side is dissolved in the raw water to attain ozonized water. In the preferred embodiment, since the noble metal net 16 having an ozone generating catalyst function and the lath net 17 made of metal having an ozone resistant characteristic are employed as the anode electrode 3 in particular, the raw water becomes a severe turbulence flow while the raw water is flowing in a flow passage constituted by the noble metal net 16 and the lath net 17, so that an eddy flow is formed, the ozone generated at the anode electrode 3 is dissolved instantaneously in the raw water just after production of ozone and at the same time its action is accumulated continuously while the ozonized water flows along the anode electrode 3, resulting in that ozonized water of high concentration can be attained under two effects of instantaneous dissolving and accumulating actions.

A concentration of ozonized water in the raw water produced in this way is measured by an ozone concentration measuring device (not shown) installed at a downstream region of the ozonized water outlet port 10 and as a trend of decreasing concentration of ozone is detected as a time elapses, a current density is gradually increased within a range of variable region of the current density so as to keep the concentration of ozone substantially constant. Then, as a result of increased density of current, if this value reaches an allowable upper limit value in the variable region of the current density, the opening or closing valve in the water supplying pipe passage is closed to stop feeding of raw water as shown in FIG. 2, and at the same time a DC voltage applied between the anode electrode 3 and the cathode electrode 4 is released, thereafter the hydraulic cylinders 14 and 15 are activated to cause the anode electrode 3 and the cathode electrode 4 to be moved backward and separated from the solid electrolyte film 5 and the operation of the device is stopped during a predetermined time until it is recovered to a state in which the solid electrolyte film 5 can be applied again for electrolysis. Then, after elapsing a predetermined period of time, the aforesaid operation is repeated again to generate ozonized water.

Accordingly, although the stop condition for a specified period of time is required for recovering a performance of the solid electrolyte film 5 through the aforesaid repetitive operation, its repeat-operation can be carried out, so that the solid electrolyte film 5 can be used for a long period of time as compared with that of the prior art and further the ozonized water can be generated while waiting for a recovering time of performance of the film without decomposing the ozonized water generating device or without replacing the solid electrolyte film 5 with another one, resulting in that an economical and efficient generating of ozonized water can be carried out. In order to attain such actions and effects as above in an efficient manner, it is also possible to arrange both this device and another ozonized water generating device having the same configuration as that above in side-by-side relation while a film performance of the solid electrolyte film 5 is recovered and to use them under change-over condition.

In the aforesaid example, it has been explained about an example in which the hydraulic cylinder 14, 15 are arranged at both the anode side casing 1 and the cathode side casing 2. However, it may also be applicable that the hydraulic cylinders may be arranged at any of the casings and in this case, the other electrode may be constituted with a resilient member being placed between the electrode and the casing. Although the same actions and effects as those described above can be attained even if such a configuration is applied, it is questionable that a slight poor recovering function as compared with the case of repeatance of separation and contact of both the electrodes may occur due to the fact that the electrode not removed from the solid electrolyte film 5 does not change its contact point with the film. In addition, in the aforesaid preferred embodiment, the hydraulic cylinders are disclosed as means for pushing or pulling the electrodes and as the hydraulic cylinders, a pneumatic cylinder system is the most suitable one in view of the fact that it has a cushioning function, although a liquid pressure cylinder may also be applicable in view of its operating speed, and further another mechanical driving means, for example, a pinion-rack mechanism or a link mechanism or the like may also be used and the electrode moving device in the present invention is not limited to the hydraulic means in particular and basically they are optional.

Figure 3:
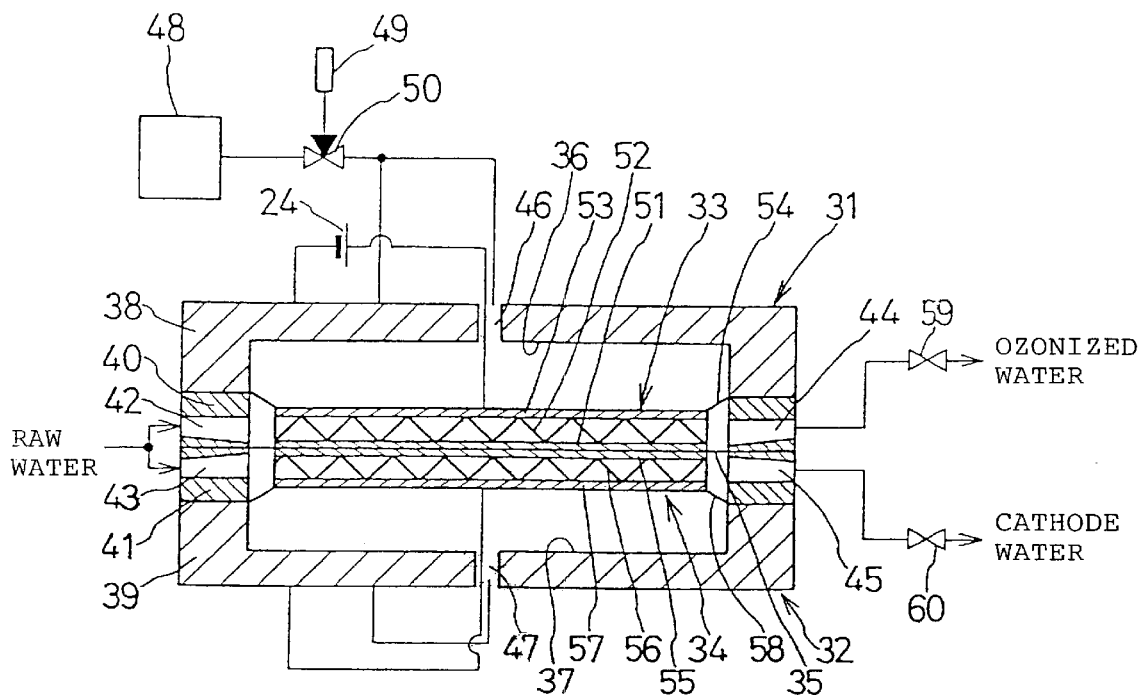
FIG. 3 is a schematic sectional view for showing a substantial part to illustrate the second preferred embodiment of the ozonized water generating device in accordance with the present invention and illustrates an impressed state of electrodes.
Figure 4:
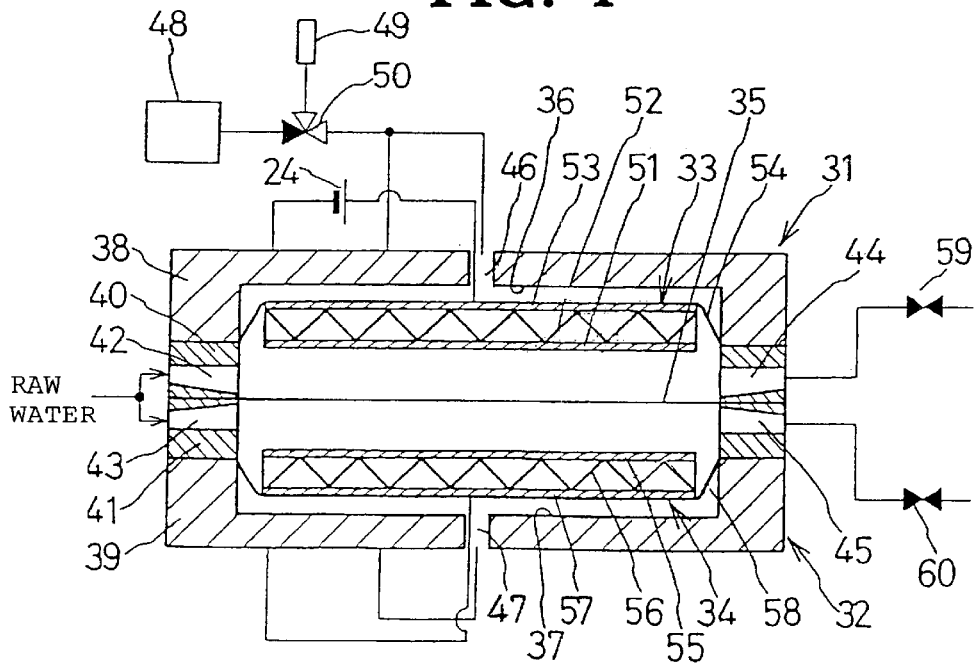
FIG. 4 shows a detached state of electrodes in the ozonized water generating device in FIG. 3.

Next, FIGS. 3 and 4 are schematic sectional views for showing a substantial part to illustrate the second preferred embodiment of the ozonized water generating device in accordance with the present invention, wherein FIG. 3 shows a state in which the electrodes are impressed against the solid electrolyte film, and FIG. 4 shows a state in which the electrodes are moved apart from the solid electrolyte film. In both figures, reference numeral 31 denotes an anode side casing, reference numeral 32 denotes a cathode side casing, reference numeral 33 denotes an anode electrode, reference numeral 34 denotes a cathode electrode and reference numeral 35 denotes a solid electrolyte film, respectively.

The anode side casing 31 and the cathode side casing 32 have the same configuration to each other in the preferred embodiment, wherein they are made of ozonized water resistant material, their central portions are formed with an indentation 36 (37) acting as an anode chamber (a cathode chamber) having such a size as one capable of storing the anode electrode 33 (the cathode electrode 34) and concurrently, a member 38 (39) with a bottom section and a ring-like member 40 (41) are overlapped from each other, each of the ring-like member 40 (41) in a front side wall and a rear side wall is formed with a flow inlet 42 (43) and a flow outlet 46 (47) for water, respectively. In addition, the bottom wall of the member 38 (39) with the bottom section is opened with a through-pass hole 46 (47), and both a pressure increasing device 48 (a pump, a compressor and the like) and an atmosphere releasing pipe 49 are connected by pipes to the through-pass hole 46 (47) via a change-over valve 50.

The anode electrode 33 is constituted such that a noble metal net 51 having an ozone generating catalyst function, a lath net 52 made of metal such as titanium having an ozone resistant characteristic and an electrode plate 53 are laminated in sequence and integrally connected by brazing and at the same time an extendible or retractable rubber diaphgram 54 is connected to the rear surface of the electrode plate 53. In addition, the cathode electrode 34 has the same constitution as that of the anode electrode 33, wherein a noble metal net 55, a lath net 56 made of metal having an ozone resistant characteristic and an electrode plate 57 are laminated in sequence and an extendible or retractable rubber diaphgram 58 is connected to the rear surface of the electrode plate 57. Then, each of these anode electrode 33 and cathode electrode 34 is fixed by bolts and nuts (not shown) with the extendible or retractable rubber diaphgrams 54, 58 being held between the members 38, 39 having bottom sections and the ring-like members 40, 41 and further each of them is stored in the indentation 36 acting as the anode chamber and the indentation 37 acting as the cathode chamber in such a way that they may be movable forward or backward. Further, reference numerals 59 and 60 denote opening or closing valves arranged at a downstream side pipe of each of the flow outlets 44, 45.

The solid electrolyte film 35 is a fluorine cation exchanging membrane which is held and fixed between a circumferential end surface (a circumferential end surface of the ring-like member 40) forming the indentation 36 of the anode side casing 31 and a circumferential end surface (a circumferential end surface of the ring-like member 41) forming the indentation 37 of the cathode side casing 32.

Then, the method for generating ozonized water under application of the ozonized water generating device having the aforesaid configuration will be described as follows. At first, the change-over valve 50 is changed over to the pressure increasing device 48 and at the same time the pressure increasing device 48 is operated to supply pressurized air to a rear space of each of the anode electrode 33 and the cathode electrode 34 to cause the space to be increased in its pressure. With such an arrangement as above, each of the anode electrode 33 and the cathode electrode 34 is impressed against the solid electrolyte film 35. Then, the opening or closing valve (not shown) in the water supplying pipe and the opening or closing valves 59, 60 at the downstream side of the flow outlet ports 44, 45 are opened to cause the raw water to flow from the flow inlet ports 42, 43 toward the flow outlet ports 44, 45 and at the same time a DC voltage is applied between the anode electrode 33 and the cathode electrode 34. with such an arrangement as above, both oxygen and ozone are generated at the anode electrode 33, hydrogen is generated at the cathode electrode 34 and ozone generated at the anode electrode is dissolved in the raw water to attain ozonized water in the same manner as that of the ozonized water generating device shown in FIGS. 1 and 2. Also in this preferred embodiment, the noble metal net 51 having ozone generating catalyst function and the lath net 52 are employed as the anode electrode 33 in the same manner as that described above, so that the raw water becomes a severe turbulence flow to generate an eddy flow while passing through a flow passage constituted by these noble metal net 51 and lath net 52, the ozone generated at the anode electrode 33 is dissolved instantaneously just after it is generated, and at the same time, its actions are accumulated continuously while it is flowing along the anode electrode 33, resulting in that the fact that the ozonized water having a high concentration can be attained under the two effects of an instantaneous dissolving and an accumulating action is the same as that described above.

Then, a concentration of ozonized water in the attained raw water is measured by an ozone concentration measuring device (not shown) arranged at a proper location in a downstream region of the flow outlet port 44 and then it is controlled by increasing a current density in such a way that a desired concentration value of ozone may be maintained as described above. Then, as the increasing of the current density reaches the allowable upper limit value in a variable region of the current density in the ozonized water generating device, the DC voltage which has been applied between the anode electrode 33 and the cathode electrode 34 is released as shown in FIG. 4, the change-over valve 50 is changed over to the atmosphere releasing pipe 49 and at the same time the opening or closing valves 59, 60 at the downstream side of the flow outlet ports 44, 45 are closed to stop discharging of the electrolized water. Supplied water pressure of the raw water may act from inside the extendible or retractable rubber diaphgrams 54, 58 under stop condition of discharging of electrolized water, thereby each of the anode electrode 33 and the cathode electrode 34 is depressed and separated from the solid electrolyte film 35, respectively. This state is held for a predetermined period of time until its performance is recovered in such a way that the solid electrolyte film 35 can be used again in electrolysis. After a predetermined period of time elapses and a performance of film is recovered, the aforesaid operation is repeated again to perform generating of ozonized water.

Accordingly, although even the ozonized water generating device in the preferred embodiment requires a stopped state of specified period of time for recovering the solid electrolyte film 35 under an application of the aforesaid repeating operation in the same manner as that of the ozonized water generating device shown in FIGS. 1 and 2, its re-starting in operation can be carried out, so that the solid electrolyte film 35 can be used for a long period of time as compared with that of the prior art. In addition, since ozonized water can be generated while waiting for a recovering time of the solid electrolyte film 35 without decomposing the ozonized water generating device and further without replacing the solid electrolyte film 25 with a new one, an economical and efficient generating of ozonized water can be carried out. In order to attain such actions and effects as described above in a more efficient manner, another ozonized water generating device having the same configuration as that of the aforesaid device is arranged side by side with the former device or a pressure increasing mechanism such as a pressure increasing device 48 or the like can be changed over in its use and a main body of another ozonized water generating device having the same configuration as that of the former device is arranged side by side with the former device, and they are changed over for their use while the film performance of the solid electrolyte film 35 is being recovered to enable a continuous generating of ozonized water to be performed.

In the aforesaid example, although the pressure increasing device 48 acting as the pressure increasing mechanism and a pneumatic system under application of the atmospheric pressure releasing pipe 49 and the change-over valve 50 have been described as example, a liquid pressure type system using a water tank, a hydraulic pump and a relief valve may also be applicable and in the case of applying liquid pressure, no density variation occurs due to its pressure, resulting in that a fast and positive impressing force can be attained.

Figure 5:
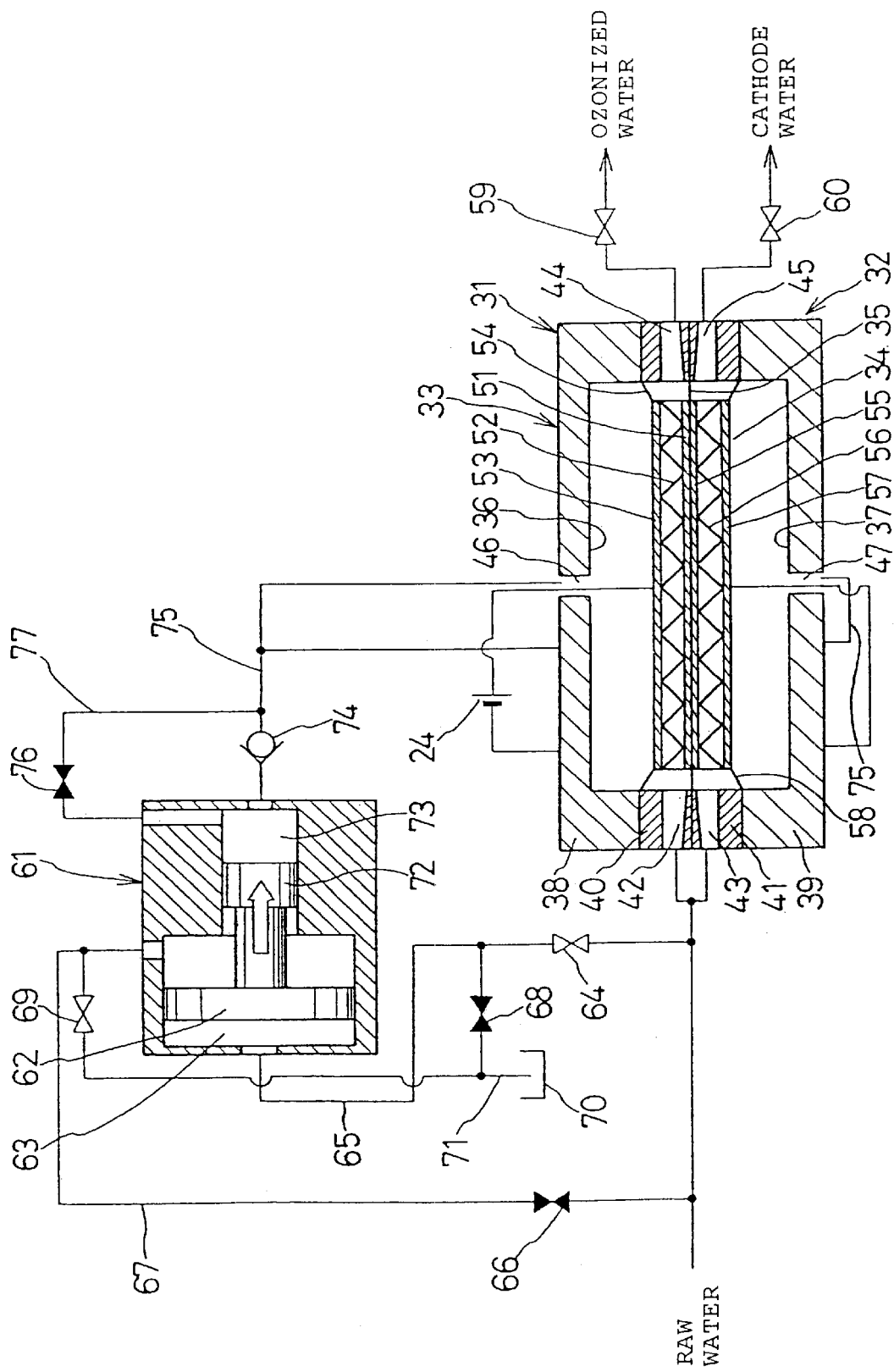
FIG. 5 is a schematic sectional view for showing a substantial part to illustrate the third preferred embodiment of the ozonized water generating device in accordance with the present invention and an impressed state of electrodes.
Figure 6:
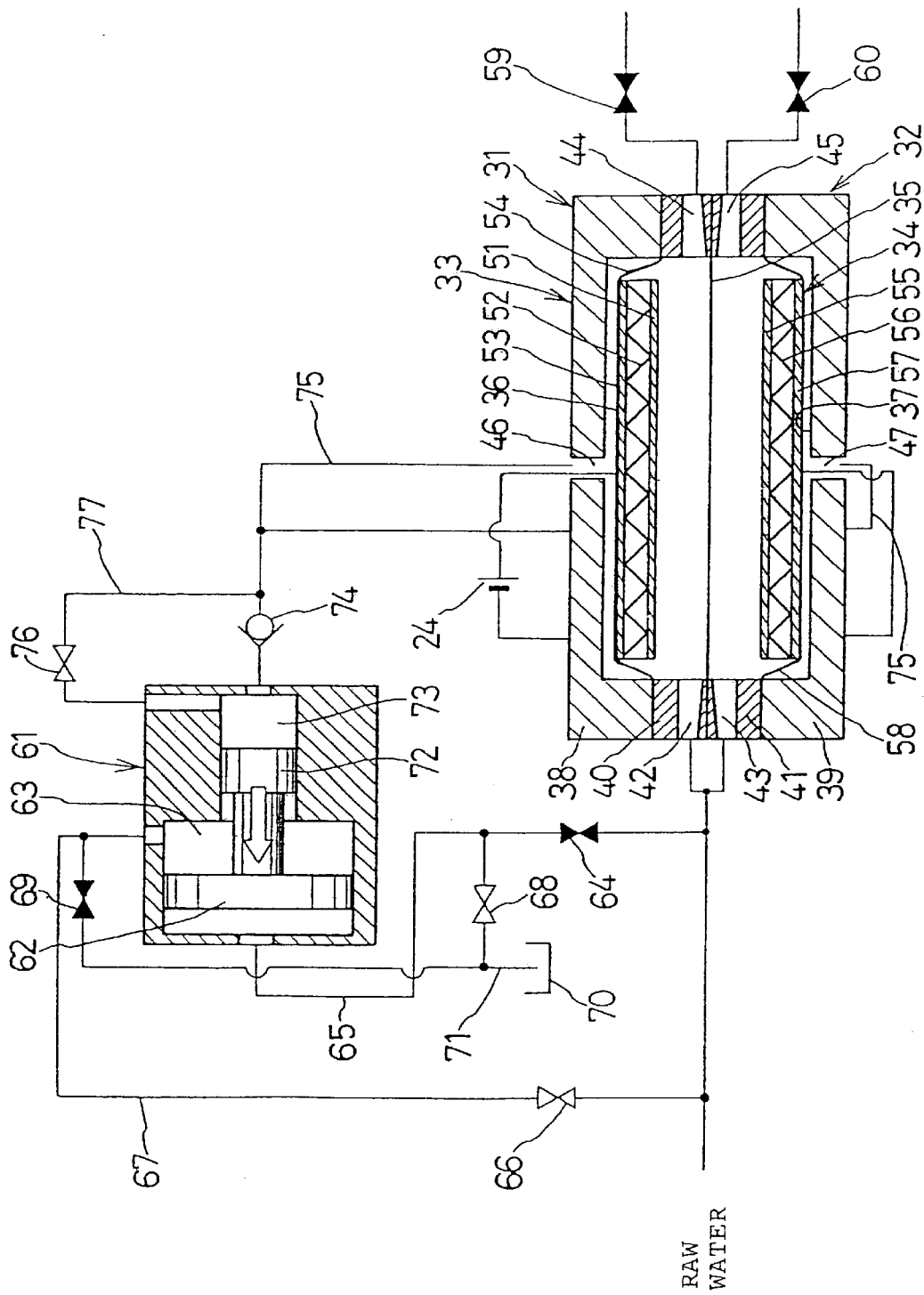
FIG. 6 shows a detached state of electrodes in the ozonized water generating device in FIG. 5.

Then, FIGS. 5 and 6 are schematic sectional views for showing a substantial part of the third preferred embodiment of the ozonized water generating device in accordance with the present invention, wherein FIG. 5 shows a state in which the electrodes are impressed against the solid electrolyte film and FIG. 6 shows a state in which the electrodes are moved away from the solid electrolyte film. The ozonized water generating device shown in these figures has basically the same configuration as that of the ozonized water generating device shown in FIGS. 3 and 4 except the fact that a pressure increasing device 61 is used in place of the pressure increasing device 48, the atmospheric pressure releasing pipe 49 and the change-over valve 50 in the ozonized water generating device shown in FIGS. 3 and 4, its major different point will be described as follows in order to avoid their dual description. At first, the pressure increasing device 61 is provided with a piping 65 while a solenoid valve 64 is being placed at a positive pressure side of a large diameter piston 62 in a cylinder chamber 63 and a piping 67 while a solenoid valve 66 is being placed at a back-pressure side which are connected to the raw water supplying pipe passage, the solenoid valves 68, 69 are placed between each of the solenoid valves 64, 66 and the pressure increasing device 61 and there is provided a drain pipe 71 for a water discharging passage 70. In addition, the positive pressure side of a small diameter piston 72 in the cylinder chamber 73 is provided with a piping 75 while a check valve 74 is being arranged between the through-pass hole 46, 47 of the casing 31, 32 and there is provided a piping 77 having a solenoid valve 76 therein acting as a bypass pipe passage for the check valve 74.

Then, the method for generating ozonized water under application of the ozonized water generating device having the aforesaid configuration will be described. At first, under a state in which the solenoid valves 64, 69 are opened and the solenoid valves 66, 68, 76 are closed, the opening or closing valve (not shown) in the water supplying pipe passage and the opening or closing valves 59, 60 at the downstream side of the flow outlet ports 44, 45 are opened and then the raw water is started to be supplied from the flow inlet ports 42, 43 toward the flow outlet ports 44, 45.

Through this supplying of water, a water supplying pressure may act against the positive pressure side of a large diameter piston 62 of the pressure increasing device 61, the water supplying pressure becomes a high pressure and acts against the positive pressure side of the small diameter piston 72, resulting in that this high pressure may act against a rear space of each of the anode electrode 33 and the cathode electrode 34 through the piping 75 to increase pressure of a pressure medium (preferably water) enclosed in this space. Through this increased pressure, each of the anode electrode 33 and the cathode electrode 34 is to impress against the solid electrolyte film 35. Then, a DC voltage is applied between the anode electrode 33 and the cathode electrode 34. With such an arrangement as above, the following reaction may occur as described above that each of oxygen and ozone is generated at the anode electrode 33 and hydrogen is generated at the cathode electrode 34 in the same manner as that found in the ozonized water generating device shown in FIGS. 1 to 4, respectively, and the ozone generated at the anode electrode 33 is dissolved in the raw water and ozonized water is produced.

A concentration of ozonized water kept in the raw water is controlled in such a way that an amount of included ozone is measured by a concentration measuring device (not shown) arranged at the downstream side of the flow outlet port 44 and a current density is increased to maintain a predetermined concentration value of ozone. Then, as the increased value of the current density reaches the aforesaid upper limit value, the DC voltage applied between the anode electrode 33 and the cathode electrode 34 is released, the solenoid valves 64, 69 are closed and the solenoid valves 66, 68, 76 are opened and at the same time the opening or closing valves 59, 60 at the downstream side of the flow outlet ports 44, 45 are closed to stop the raw water. Due to the stop of supplying the raw water, water supplying pressure of the raw water may act from inside the extendible or retractable rubber diaphragms 54, 58 and from the back-pressure side of a large diameter piston 62 of the pressure increasing device 61, as shown in FIG. 6, thereby each of the anode electrode 33 and the cathode electrode 34 is detached from the solid electrolyte film 35 and separated from it. The stop condition is kept for a predetermined period of time under this state until a performance of the solid electrolyte film 35 is recovered to such a degree as one in which it can be used in electrolysis. After elapsing of the predetermined period of time, the aforesaid operation is repeated again to generate ozonized water.

Accordingly, the ozonized water generating device having the aforesaid configuration also enables its re-starting in operation to be carried out by the aforesaid repeated operation in the same manner as that of the ozonized water generating device shown in FIGS.1 to 4 even though a stop condition for a specified period of time is required for recovering the solid electrolyte film 35, resulting in that the solid electrolyte film 35 can be used for a long period of time and ozonized water can be generated while waiting for its recovering time without decomposing the ozonized water generating device and without replacing the solid electrolyte film 35 with a new one, so that an economical and efficient generating of ozonized water can be performed and further in order to attain such actions and effects as described above in a more efficient manner, another ozonized water generating device having the same configuration is arranged side by side with the former device or the pressure increasing device 61 can be used in its change-over condition and a main body of another ozonized water generating device is arranged side by side with the former device, and they may be used in its change-over condition while the film performance of the solid electrolyte film 35 is being recovered.

Figure 7:
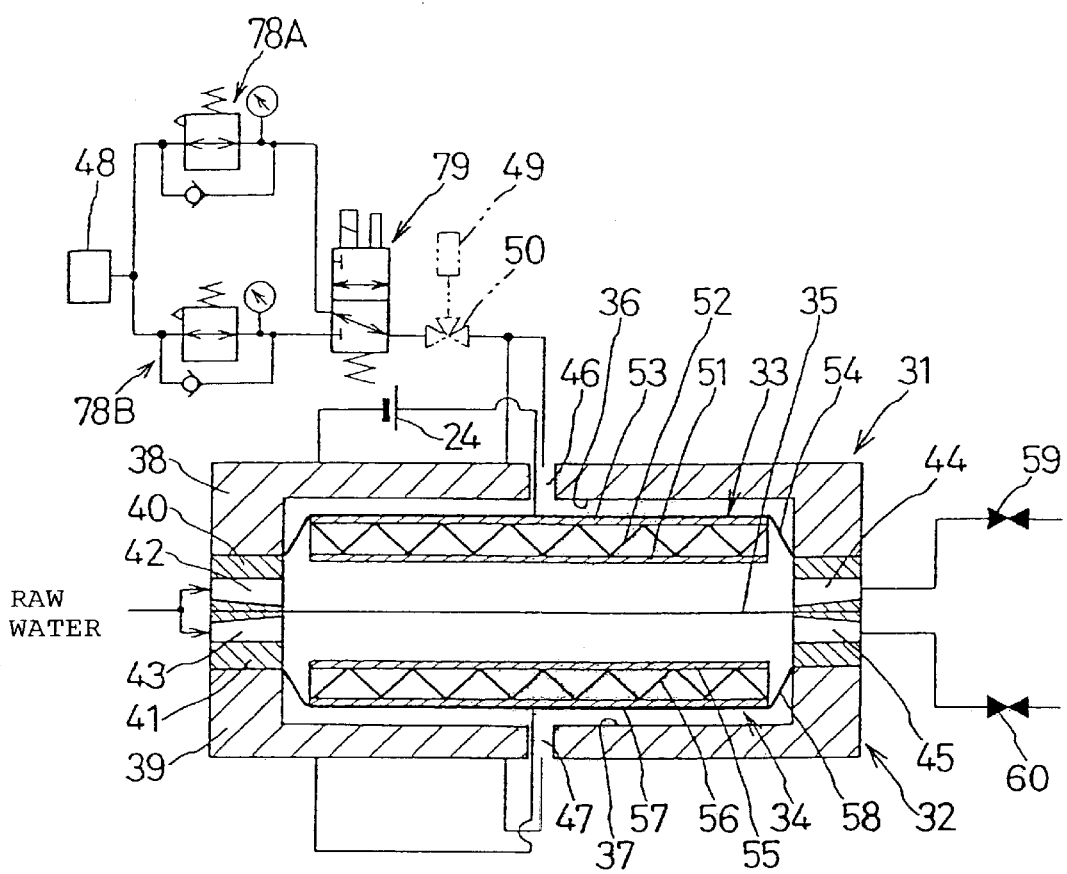
FIG. 7 is a schematic sectional view for showing a substantial part to illustrate the fourth preferred embodiment of the ozonized water generating device in accordance with the present invention and illustrates a detached state of electrodes.

Next, FIG. 7 is a schematic sectional view for showing a substantial part to illustrate the fourth preferred embodiment of the ozonized water generating device in accordance with the present invention. The ozonized water generating device shown in FIG. 7 has basically the same configuration as that shown in FIGS. 3 and 4 except the arrangement in which two pressure adjusting valves 78A, 78B and a solenoid valve 79 are used in place of the atmospheric pressure releasing pipe 49 and the change-over valve 50 of the ozonized water generating device shown in FIGS. 3 and 4, and the same configurations are denoted by the same reference numerals and their detailed description will be eliminated.

In FIG. 7, the two pressure adjusting valves 78A, 78B are arranged in parallel between the pressure increasing device 48 and the solenoid valve 79 and a set pressure of one pressure adjusting valve 78A is set to be lower than the set pressure of the other pressure adjusting valve 78B.

Figure 8A:
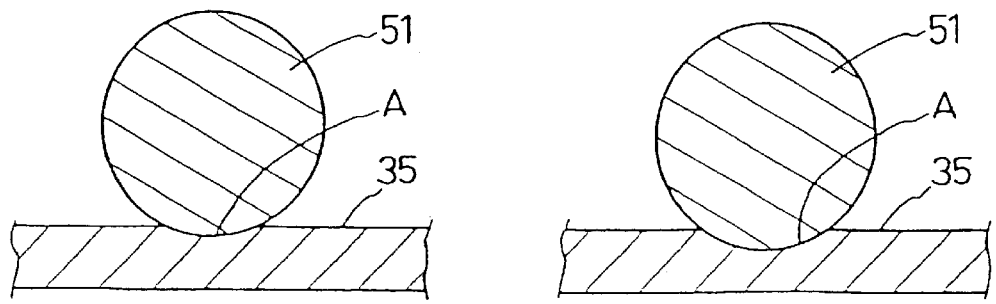
FIG. 8 is a schematic sectional view for showing a change of a contacted state between electrodes and a solid electrolyte film in reference to a value of impressing force of electrodes against the solid electrolyte film in the ozonized water generating device in accordance with the present invention.
Figure 8B:
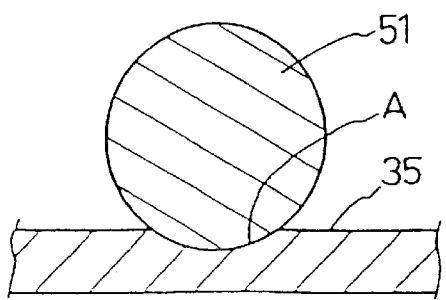

A method for generating ozonized water under application of the ozonized water generating device having the aforesaid configuration will be described, wherein at first, the solenoid valve 79 is operated to cause a flow passage of the pressure adjusting valve 78A having the low set pressure to be communicated with the pressure increasing device 48 (state shown in the figure), the pressure increasing device 48 is operated to supply pressurized air in a rear space of each of the anode electrode and the cathode electrode to increase pressure in it. This increased pressure causes each of the anode electrode 33 and the cathode electrode 34 to be impressed against the solid electrolyte film 35 with the set pressure of the pressure adjusting valve 78A. The opening or closing valve (not shown) in the water supplying pipe passage and the opening or closing valves 59, 60 at the downstream side of the flow outlet ports 44, 45 are opened to cause the raw water to be flowed from the flow inlet ports 42, 43 toward the flow outlet ports 44, 45 and at the same time when a DC voltage is applied between the anode electrode 33 and the cathode electrode 34, both oxygen and ozone are generated at the anode electrode 33 and hydrogen is generated at the cathode electrode 34 in the same manner as that described above, the generated ozone is dissolved in the raw water to form ozonized water. A concentration of the produced ozonized water is measured by a concentration measuring device (not shown) arranged at a downstream region of the flow outlet port 44 and it is controlled by increasing a current density to maintain a desired concentration value. Then, as shown in FIG. 9, when a current density at the time t1 reaches a predetermined upper limit value, the solenoid valve 79 is operated to cause the flow passage of the pressure adjusting valve 78B having a high set pressure value to be communicated with the pressure increasing device 48. With such an arrangement as above, a pressure at a rear space of each of the anode electrode 33 and the cathode electrode 34 is increased and impressing pressures of the anode electrode 33 and the cathode electrode 34 against the solid electrolyte film 35 are increased, so that as shown in FIG. 8, an area of the impressing surface A of the noble metal net 51 having ozone generating catalyst function of the anode electrode 33 against the solid electrolyte film 35 is increased from the condition of low pressure impressing in FIG. 8(a) to the condition of high pressure impressing in FIG. 8(b) and a new impressing surface is generated. As a result, as shown in FIG. 9, since a predetermined current density applied for generating ozonized water having a predetermined concentration of ozone is started to decrease from the time t1 in which the impressing force is increased, it is possible to continue the generating of the ozonized water having a predetermined concentration of ozone during a period t2 when the current density reaches a predetermined upper limit value and then an electrolysis time of the solid electrolyte film 35 can be extended.

Subsequent to the time t2, although the operation with the current density being kept the upper limit value is performed, performance of the solid electrolyte film 35 is gradually decreased, resulting in that a concentration of ozone in the ozonized water is also gradually decreased. Thus, the operation of the device is stopped at the predetermined time t3 within a range where a reduction in concentration of ozone is allowed. This stop operation of the device causes the anode electrode 33 and the cathode electrode 34 to be detached to release the impressing force of the solid electrolyte film 35 in the same manner as the aforesaid case, resulting in that a performance of the solid electrolyte film 35 is recovered.

Figure 10:
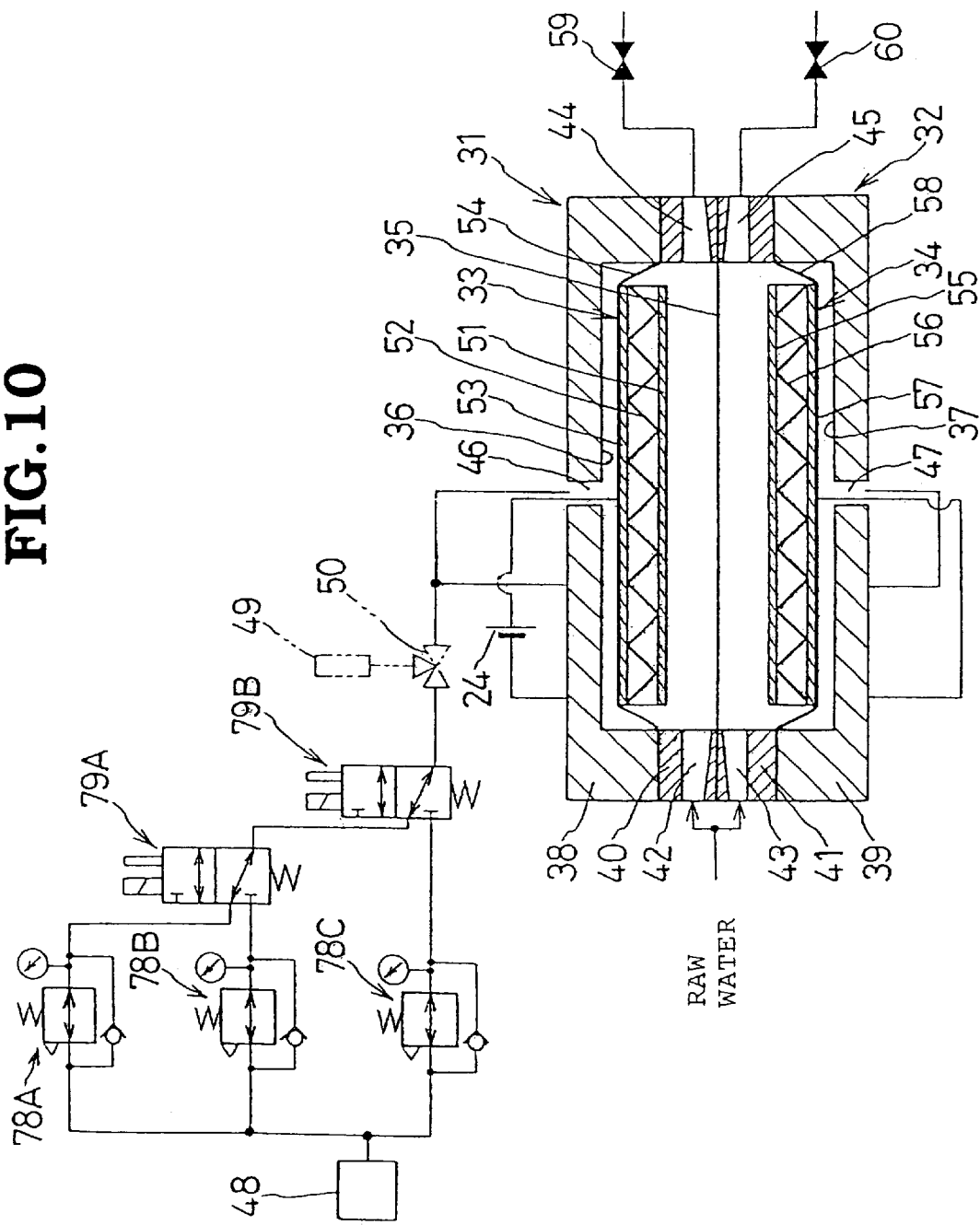
FIG. 10 is a schematic sectional view for showing a substantial part to illustrate a modification of the fourth preferred embodiment of the ozonized water generating device in accordance with the present invention shown in FIG. 7 and illustrates a detached state of electrodes.

In the aforesaid preferred embodiment, although the example in which the two pressure adjusting valves 78A, 78B are used has been described, the present invention is not limited to this example, and it becomes possible to perform second times of pressure increasing operation shown in FIG. 9 by three times and to extend a continuous operating time by arranging three pressure adjusting valves 78A, 78B, 78C and two solenoid valves 79A, 79B as shown in FIG. 10 within a range in which generating of ozonized water can be carried out efficiently. That is, in FIG. 10, the set pressures of the three pressure adjusting valves 78A, 78B, 78C are set to have a relation of 78A<78B<78C, wherein at first, the pressure adjusting valve 78A is communicated with the pressure increasing device 48 to impress each of the electrodes 33, 34 against the solid electrolyte film 35 at a low pressure to generate ozonized water and when the current density reaches the initial upper limit value at the time t1 as shown in FIG. 9, the pressure adjusting valve is changed over from the valve 78A of low pressure setting to the valve 78B of middle pressure setting. Then, as shown in FIGS. 8(a) and (b), an impressing contact area between the electrode and the solid electrolyte film is widened and it becomes possible again to generate ozonized water having a predetermined concentration under a low current density as shown in FIG. 9. Subsequently, as the operation is carried out while the current density is being increased again to cause a concentration of ozone in the ozonized water to be maintained at a predetermined concentration while the concentration of ozone is being increased under application of the aforesaid procedure and the current density reaches the upper limit value of the second times at the time t2, the pressure adjusting valve is changed over from the 78B of middle pressure setting to the 78C of high pressure setting, resulting in that the current density is similarly reduced and it reaches the upper limit value of the third time through an increasing stage of the current density. At this time, a stop operation of the device caused by the separation of the electrodes from the solid electrolyte film and a recovering of performance of the solid electrolyte film are carried out.

Further, although it is also possible to arrange a large number of pressure adjusting valve 78 and solenoid valve 79 and to perform a similar multi-stage operation, it is also impossible that the pressure adjusting valve 78 and the solenoid valve 79 are increased without limit in their number, but an electric pneumatic regulator is arranged in place of these elements and an impressing force is controlled in a stepless manner by this electro-vacuum regulator. In addition, as indicated by an imaginary line in FIGS. 7 and 10, it may also be applicable that the atmospheric pressure releasing pipe 49 and the change-over valve 50 as shown in FIG. 3 are arranged at the downstream side of the solenoid valve 70 or the downstream side of the electro-vacuum regulator. In this way, after the atmospheric pressure releasing pipe 49 and the change-over valve 50 are arranged to cause the impressing force applied to the solid electrolyte film 35 to be changed in a stepwise manner or continuously to perform a continuous operation, if the increased current density at the final stage reaches the upper limit value, the same operation as that shown in FIG. 3 is carried out to cause each of the anode electrode 33 and the cathode electrode 34 to be detached from the solid electrolyte film 35, respectively, the stop operation is performed for a predetermined period of time until the solid electrolyte film 35 is recovered again to the condition capable of being used in electrolysis and subsequently again an operation for increasing an impressing force of the anode electrode 33 and the cathode electrode 34 against the solid electrolyte film 35 and an operation for separating the electrodes from the solid electrolyte film to recover the performance are performed repeatedly to enable an elongation of life of the solid electrolyte film 35 to be substantially increased.

Figure 11:
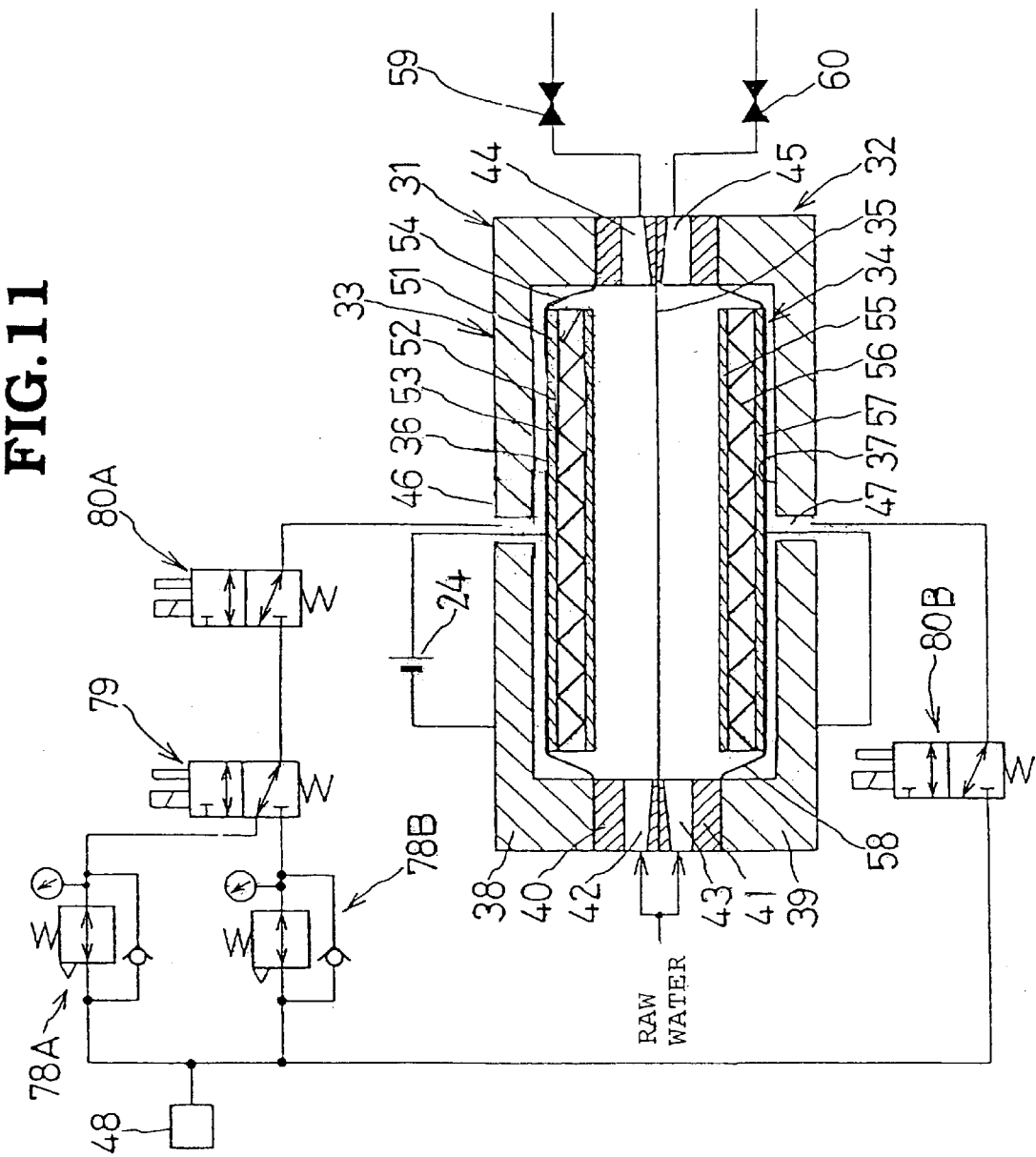
FIG. 11 is a schematic sectional view for showing a substantial part to illustrate the fifth preferred embodiment of the ozonized water generating device in accordance with the present invention and illustrates a detached state of electrodes.
Figure 12:
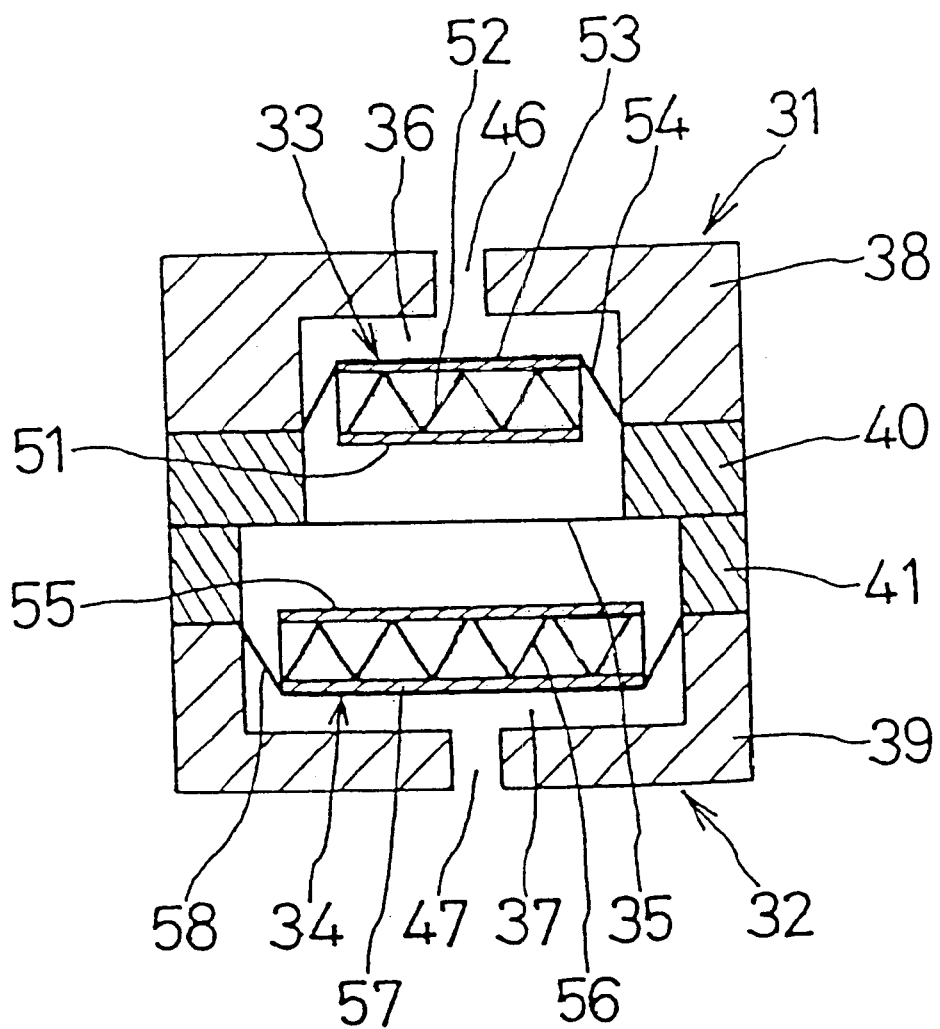
FIG. 12 is a schematic sectional view taken in a width direction of the ozonized water generating device in accordance with the present invention.
Figure 13:
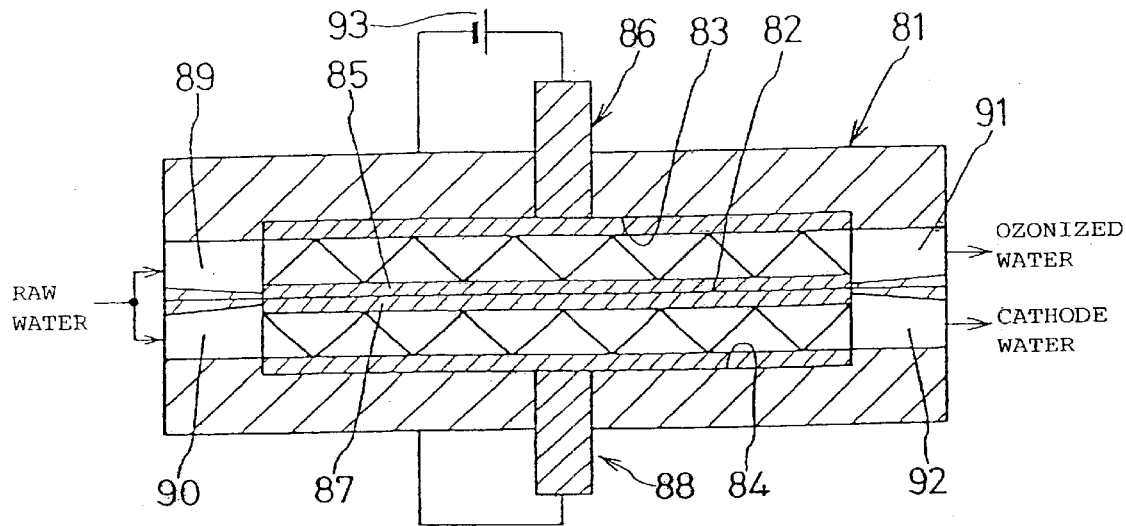
FIG. 13 is a schematic sectional view for showing a substantial part of the prior art ozonized water generating device.
Figure 14:
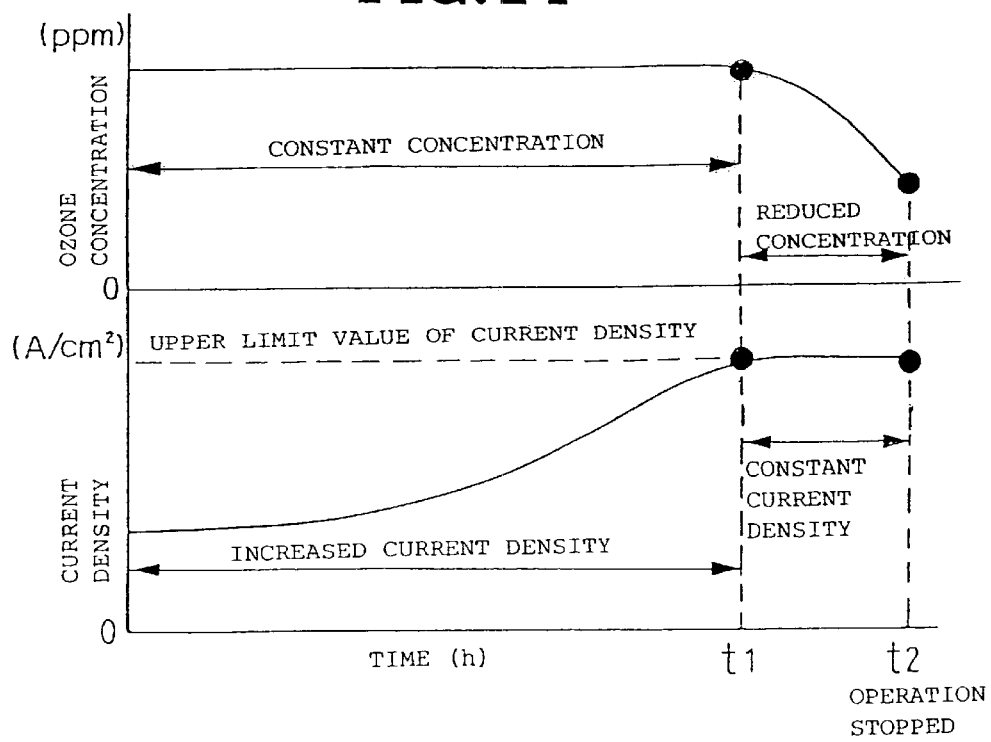
FIG. 14 is an illustrative view for showing a relation between an electrolysis elapsing time and a current density for keeping a concentration of ozone constant.

Next, FIG. 11 is a schematic sectional view for showing a substantial part to illustrate the fifth preferred embodiment of the ozonized water generating device in accordance with the present invention, wherein this preferred embodiment has basically the same configuration as that of the ozonized water generating device shown in FIG. 7 except the arrangement in which the two pressure adjusting valves 78A, 78B and the solenoid valve 79 in the ozonized water generating device shown in FIG. 7 are arranged in one through-pass hole 46 with the solenoid valve 80A being placed therein and the other through-pass hole 47 is connected by a pipe to the pressure increasing device 48 with the solenoid valve 80B being placed therein. That is, in FIG. 11, the impressing force of the anode electrode 33 against the solid electrolyte film 35 can be adjusted in two steps by the two pressure adjusting valves 78A, 78B and to the contrary, an impressing force of the cathode electrode 34 against the solid electrolyte film 35 is kept constant. With such an arrangement as above, only the impressing force of the anode electrode 33 against the solid electrolyte film 35 is changed in two steps to perform a continuous operation. Further, the solenoid valves 80A, 80B are changed over to enable an impressing hydraulic pressure of each of the electrodes against the solid electrolyte film 35 to be released into atmosphere. In addition, in order to prevent the solid electrolyte film 35 from being damaged during the releasing time, a timing is set such that the solenoid valve 80A is released to open prior to the solenoid valve 80B.

In the ozonized water generating device shown in FIGS. 1 to 11 described above, a symmetrical shape in which each of the anode electrode, the cathode electrode, the a node chamber and the cathode chamber has the same longitudinal length and width sizes has been described, although the present invention is not limited to this example, and it is also applicable that the width of the anode electrode 33 is set to be smaller than the width of the cathode chamber 34 and at the same time in compliance with this state the width of the anode chamber 36 is formed to be smaller than the width of the cathode chamber 37. Such a formation as above causes the solid electrolyte film 35 to be easily arranged between the anode chamber 36 and the cathode chamber 37 (a central position of flowing of the raw water) under a state in which the film is being held between the anode electrode 33 and the cathode electrode 34 when the ozonized water is generated, resulting in that an increasing in efficiency of generating of the ozonized water is expected.

The above description has been made in reference to a system in which an electrolysis reaction is carried out under a state of holding the impressing force of the electrodes against the solid electrolyte film at a substantial constant value and a current density is increased in such a way that a concentration of ozone in the produced ozonized water may be kept substantially constant, although there may be applied another method in which an impressing force of the electrodes against the solid electrolyte film is changed in such a way that a concentration of ozone in the produced ozonized water may become substantially constant with a current density kept constant. More practically, the following methods can be realized:

(1) a method in which an electrolysis reaction is carried out under a state in which a current density is kept at a substantial predetermined value, a concentration of ozone in the generated ozonized water is measured, an impressing force of the electrodes against the solid electrolyte film is changed in such a way that a concentration of the ozone may become substantially constant and as the impressing force reaches a predetermined upper limit value, applying of a DC voltage is stopped to terminate generating of the ozonized water and at the same time the electrodes are separated from the solid electrolyte film to release the impressing force against the solid electrolyte film, a performance of the solid electrolyte film is recovered and after this operation, the electrolysis is started again: and (2) a method in which an electrolysis reaction is carried out under a state in which a current density is kept at a first set value of a low current density, a concentration of ozone in the generated ozonized water is measured, an impressing force of the electrodes against the solid electrolyte film is changed in such a way that a concentration of the ozone may become substantially constant and as the current density reaches a predetermined upper limit value, the impressing force is increased up to a second set value of higher value than the first set value, thereby a required impressing force is decreased and subsequently the electrolysis operation is continued and at the same time, the impressing force is increased in such a way that the concentration of the ozone may become substantially constant, as the current density reaches the predetermined upper limit value, the impressing force is increased again to a higher third set value, a subsequent similar operation is repeated until both the current density and the impressing force reach the upper limit values of the device, as both values reach the upper limit values of the device, applying of a DC voltage is stopped to terminate generating of the ozonized water and at the same time the electrodes are separated from the solid electrolyte film to release the impressing force against the solid electrolyte film, a performance of the solid electrolyte film is recovered and after this operation, the electrolysis is started again.

In the aforesaid description, in the case that a concentration of the generated ozonized water is measured and either the current density or impressing force is changed in such a way that its value may become the set value, a specified delay is present between these variations and the variation of concentration of ozonized water, so that it is preferable to increase a current density or increase an impressing force in reference to these delays in such a way that the concentration of ozone in the generated ozonized water may not become less than a predetermined value. In particular, since the variation of concentration of the ozonized water caused by the variation of the impressing force is influenced by a size of the device or a shape of each of the electrodes or a structure of each of the electrodes and the like, it is preferable to set the most-suitable changing timing through an actual operation. In turn, a variation of concentration of ozonized water caused by a variation of current density is detected under a relative fast timing, so that it is a convenient and preferable system to employ a variation of current density as a control factor.

As described above, in accordance with the ozonized water generating device of the present invention, since one of or both anode electrode and cathode electrode are arranged in such a way that they can be impressed against and depressed from the solid electrolyte film by a movable driving means, even if the performance of the solid electrolyte film is deteriorated and the concentration of ozone is decreased, the performance of the film can be recovered by increasing the impressing force of each of the electrodes or removing the electrodes from the film, a continuous application of the film can be carried out without replacing the film with a new one, a life of the solid electrolyte can be improved and an ozonized water generating cost can be reduced. Further, the number of times in which the ozonized water generating device is decomposed and the solid electrolyte film is replaced with a new one can be substantially reduced, resulting in that it may be expected to have many effects that an operating rate of the ozonized water generating device can be improved and its maintenance may easily be carried out, so that it becomes possible to apply ozonized water in many fields such as cooking of foods, sterilization during washing operation or sterilization water in a kitchen area.

What is claimed is:

1. An ozonized water generating device in which an inside of a casing is defined by a solid electrolyte film into an anode chamber and a cathode chamber, an anode electrode made of noble metal having an ozone generating catalyst function is arranged to be impressed against said solid electrolyte film at said anode chamber, a cathode electrode is arranged to be impressed against said solid electrolyte film at said cathode chamber, each of said anode chamber and said cathode chamber is provided with a raw water flow inlet port and electrolyzed water flow outlet port, and a DC voltage can be applied between said anode electrode and said cathode electrode, wherein at least one of said anode electrode and said cathode electrode are adapted to be impressed against and removed from said solid electrolyte film by a movable driving means.

2. An ozonized water generating device according to claim 1 in which said movable driving means is a mechanical driving device operated under hydraulic pressure.

3. An ozonized water generating device according to claim 1 in which said movable driving means is comprised of an extendible or retractable film member connected and arranged to each of the electrodes at each of the rear surfaces of said anode electrode and said cathode electrode, a space formed by said film member at a rear side of each of the electrodes in each of the electrode chambers of said anode chamber and said cathode chamber, a piping system for flowing pressure medium from a pressure increasing device into said space, and a change-over valve formed in said piping system and capable of changing-over said space between said pressure increasing device and an atmospheric pressure releasing pipe, wherein said electrodes are impressed against said solid electrolyte film with a pressure of the pressure medium supplied from said pressure increasing device into said space, the pressure medium in said space is discharged out of said space with supplied pressure of said raw water under an operation of said change-over valve to cause said electrodes to be separated from said solid electrolyte film.

4. An ozonized water generating device according to claim 1 in which said movable driving means is comprised of an extendible or retractable film member connected and arranged to each of the electrodes at each of the rear surfaces of said anode electrode and said cathode electrode, a space formed by said film member at a rear side of each of the electrodes in each of the electrode chambers of said anode chamber and said cathode chamber, a piping system having a pressure increasing device for flowing pressure medium into said space, and an opening or closing valve arranged at a downstream side piping of said electrolyzed water flow outlet of each of said electrode chambers and supplying pressure of said raw water is utilized as an operating pressure medium of said pressure increasing device.

5. An ozonized water generating device according to claim 1 in which said anode electrode is formed by a noble metal net having an ozone generating catalyst function and a metallic lath net having an ozone resistant characteristic is arranged at a rear surface of said net.

6. An ozonized water generating device according to claim 1 in which an impressing force of said electrodes against said solid electrolyte film can be changed in a stepwise manner or a continuous manner by said movable driving means.

7. An ozonized water generating device according to claim 1 in which a width of said anode electrode is formed to be smaller than a width of said cathode electrode and a size of said anode chamber is formed to be smaller than that of said cathode chamber.

8. An ozonized water generating device according to claim 1, wherein said driving means moves in response to a detection of ozone concentration.

9. An ozonized water generating device according to claim 8, wherein said movable driving means is a mechanical driving device operated under hydraulic pressure.

10. An ozonized water generating device according to claim 8, wherein said anode electrode is formed by a noble metal net having an ozone generating catalyst function and a metallic lath net having an ozone resistant characteristic is arranged at a rear surface of said net.

11. An ozonized water generating device according to claim 8, wherein an impressing force of said electrodes against said solid electrolyte film can be changed in a stepwise manner or a continuous manner by said movable driving means.

12. A method for generating ozonized water in which an anode electrode made of noble metal having an ozone generating catalyst function is arranged at one surface of a solid electrolyte film, a cathode electrode is arranged at the other surface of said solid electrolyte film, at least one of both electrodes can be movable towards or away from said solid electrolyte film, a DC voltage is applied between said electrodes while raw water is flowing at each of the electrodes to generate ozonized water characterized in that the ozonized water is generated under a state in which at least one of said electrodes is being impressed against said solid electrolyte film with a predetermined impressing force, a concentration of ozone in said generated ozonized water is detected and a current density of said DC current is changed in response to a variation of said concentration of ozone in such a way that said concentration of ozone may become substantially constant.

13. A method for generating ozonized water according to claim 12 in which a concentration of ozone in said generated ozonized water is detected, said current density is increased before said concentration becomes less than a predetermined value and as said current density reaches a predetermined upper limit value, an impressing force of said electrodes against the solid electrolyte film is increased.

14. A method for generating ozonized water according to claim 12 in which a concentration of ozone in said generated ozonized water is detected, applying of said DC voltage is stopped before said concentration becomes less than a predetermined concentration, an impressing force of said electrodes against said solid electrolyte film is released, a DC voltage is applied again after elapsing a predetermined period of time, said electrodes are impressed against said solid electrolyte film to restart generating of ozonized water.

15. A method for generating ozonized water according to claim 12 in which a concentration of ozone in said generated ozonized water is detected, said current density is increased before said concentration becomes less than a predetermined concentration, as said current density reaches a predetermined upper limit value, an operation for increasing an impressing force of said electrodes against said solid electrolyte film is carried out at least more than once, thereafter applying of said DC voltage is stopped before said concentration of ozone becomes less than a predetermined concentration, an impressing force of said electrodes against said solid electrolyte film is released, a DC voltage is applied again after elapsing a predetermined period of time, said electrodes are impressed against said solid electrolyte film to restart generating of ozonized water.

16. A method for generating ozonized water in which an anode electrode made of noble metal having an ozone generating catalyst function is arranged at one surface of a solid electrolyte film, a cathode electrode is arranged at the other surface of said solid electrolyte film, at least one of both electrodes can be movable towards or away from said solid electrolyte film, a DC voltage is applied between said electrodes while raw water is flowing at each of the electrodes to generate ozonized water characterized in that a predetermined DC current value is energized between said electrodes under a state in which at least one of said electrodes is being impressed against said solid electrolyte film, a concentration of ozone in the generated ozonized water is detected and an impressing force of said electrodes against said solid electrolyte film changed in response to a variation of a said concentration of ozone in such a way that said concentration of ozone may become substantially constant.

17. A method for generating ozonized water according to claim 16 in which a concentration of ozone in said generated ozonized water is detected, an impressing force of said electrodes against the solid electrolyte film is increased before said concentration becomes less than a predetermined value and as said impressing force reaches a predetermined upper limit value, said current density is increased.

18. A method for generating ozonized water according to claim 16 in which a concentration of ozone in said generated ozonized water is detected, applying of said DC voltage is stopped before said concentration becomes less than a predetermined concentration, an impressing force of said electrodes against said solid electrolyte film is released, a DC voltage is applied again after elapsing a predetermined period of time and at the same time said electrodes are impressed against said solid electrolyte film to restart generating of ozonized water.

19. A method for generating ozonized water according to claim 16 in which a concentration of ozone in said generated ozonized water is detected, an impressing force of said electrodes against said solid electrolyte film is increased before said concentration becomes less than a predetermined concentration, as said impressing force reaches a predetermined upper limit value, after an operation for increasing said current density is carried out at least more than once, applying of said DC voltage is stopped before said concentration of ozone becomes less than a predetermined concentration, an impressing force of said electrodes against said solid electrolyte film is released, a DC voltage is applied again after elapsing a predetermined period of time, said electrodes are impressed against said solid electrolyte film to restart generating of ozonized water.

20. A method for generating ozonized water according to claim 12 in which a plurality of ozonized water generating devices are installed, said plurality of ozonized water generating devices are changed over in operation to generate ozonized water in a continuous manner in such a way that an ozonized water generating state is produced at least one unit of ozonized water generating device under a state in which the applying of said DC voltage is stopped in at least one unit of ozonized water generating device and an impressing of said electrodes against the solid electrolyte film is released.

* * * * *